(12) United States Patent
Kassai et al.

(10) Patent No.: US 6,170,911 B1
(45) Date of Patent: Jan. 9, 2001

(54) CHILD SEAT

(75) Inventors: Kenzou Kassai; Hiroyasu Yamamoto; Yoshifumi Yoneda, all of Osaka (JP)

(73) Assignee: Aprica Kassai Kabushikikaisha, Osaka (JP)

(*) Notice: Under 35 U.S.C. 154(b), the term of this patent shall be extended for 0 days.

(21) Appl. No.: 09/237,400

(22) Filed: Jan. 26, 1999

(30) Foreign Application Priority Data

Jan. 27, 1998 (JP) .................................................. 10-014346
Sep. 11, 1998 (JP) .................................................. 10-258069

(51) Int. Cl.$^7$ ...................................................... A47C 1/08
(52) U.S. Cl. ..................... 297/250.1; 248/421; 248/116; 116/215; 297/256.13; 297/344.15
(58) Field of Search ............................ 297/256.1, 256.11, 297/256.13, 344.15, 328, 250.1; 248/421, 157; 116/215, 200

(56) References Cited

U.S. PATENT DOCUMENTS

| | | |
|---|---|---|
| 4,205,877 | 6/1980 | Ettridge . |
| 4,274,674 | 6/1981 | Deloustal . |
| 4,762,364 | 8/1988 | Young . |
| 4,798,412 * | 1/1989 | Kohus et al. .................. 297/256.11 |
| 4,936,629 | 6/1990 | Young . |
| 4,998,307 | 3/1991 | Cone . |
| 5,183,312 | 2/1993 | Nania . |
| 5,496,092 | 3/1996 | Williams et al. . |
| 5,551,751 * | 9/1996 | Sedlack et al. ................. 297/256.13 |
| 5,609,393 * | 3/1997 | Meeker et al. .................. 297/256.13 |
| 5,681,082 * | 10/1997 | Drexler ............................. 297/256.1 |
| 5,681,084 | 10/1997 | Yoneda . |
| 5,746,478 * | 5/1998 | Lumley et al. ................. 297/256.13 |
| 5,836,650 * | 11/1998 | Warner, Jr. et al. ............ 297/256.11 |
| 5,890,762 * | 4/1999 | Yoshida ........................... 297/256.13 |

FOREIGN PATENT DOCUMENTS

| | | |
|---|---|---|
| 4137599 | 5/1993 | (DE) . |
| 0009439 | 4/1980 | (EP) . |
| 0426585 | 5/1991 | (EP) . |
| 0545185 | 6/1993 | (EP) . |
| 2256364 | 12/1992 | (GB) . |
| 62-43835 | 3/1987 | (JP) . |
| 1113007 | 5/1989 | (JP) . |
| 190654 | 6/1989 | (JP) . |
| 7017312 | 1/1995 | (JP) . |
| 10250426 | 9/1998 | (JP) . |
| 91/00193 | 1/1991 | (WO) . |

OTHER PUBLICATIONS

Japanese Industrial Standard (JIS), Automotive accessories—Child restraints, JIS D 0401–1996.

* cited by examiner

*Primary Examiner*—Peter M. Cuomo
*Assistant Examiner*—Stephen Vu
(74) *Attorney, Agent, or Firm*—W. F. Fasse; W. G. Fasse

(57) ABSTRACT

A child seat has an upper base section (1) and a lower base section (201) for changing an inclination angle between these base sections. The upper base section 1 and the lower base section (201) are journaled rotatably about a common journal axis (201A) at the front portion of the base. At a rear end side, an inclination angle changing mechanism (200) is installed for adjusting a spacing between the upper base section (1) and the lower base section (201) opposite the journal axis (201A). This structure provides a child seat allowing adjustment of the angle of inclination of a support surface supporting a child even if the child supporting surface extends lengthwise of a passenger car seat to which the base formed by the two base sections 1 and 201, is attached. This leveling of the child supporting surface is possible if the child seat (2) is rotatable about a vertical axis relative to its base.

6 Claims, 8 Drawing Sheets

CHILD SEAT

FIELD OF THE INVENTION

The present invention relates to a child seat and, more particularly, to an improvement of its structure.

BACKGROUND INFORMATION

In recent years safety measures have emerged as a critical factor for vehicles, and various vehicular child safety seats have been developed as a device for ensuring the safety of a new-born baby, an infant, a toddler and a child of school age (referred generally as "child" hereinafter) riding in a vehicle.

A schematic structure of a vehicular child safety seat is disclosed in Japanese Patent Application No. 9-289733 filed on Oct. 22, 1997 and laid-open on Sep. 22, 1998 under Japanese Patent Laying-Open No. 10-250426, by the same applicant as the present application. Japanese Patent Application 9-289733 corresponds to U.S. patent application Ser. No. 09/004,699, filed on Jan. 8, 1998, which will be described herein with reference to present FIG. 8.

The vehicular child safety seat (hereinafter referred to as vehicular child safety seat) 100 includes a base 1 fixed by a seat belt (not shown) installed in the vehicle, and a seat apparatus 2 rotatably supported with respect to the base.

The seat apparatus 2 includes a seat portion 3 for supporting an infant, a back rest 4 coupled in a reclinable manner to the seat portion 3, and a head guard 5 for protecting the head of the child when the back rest is fully reclined backward.

A pair of arm rests 6 and 7 are provided on opposing sides of the seat portion 3, and a pair of side guards 8 and 9 are provided on opposing sides of the back rest 4. Further, support guards 10 and 11 for keeping or supporting the sides of the child's head are provided inside the pair of side guards 8 and 9.

The vehicular child safety seat 100 having the above described structure allows change in shape as the child grows. When the seat apparatus 2 is positioned laterally with respect to the direction of travel of the vehicle with the back rest 4 fully reclined backward, the child seat is so shaped as to provide a bed on which an infant can rest.

When the back rest 4 is raised, the seat apparatus 2 provides a sitting portion, and the vehicular child seat 100 can be used by a new-born baby, infant, toddler, to a child of a school age, with the seat apparatus 2 fixed on the base 1 facing forward or rearward.

As described above, with the vehicular child seat disclosed in Japanese Patent Application No. 9-289733 it is possible to provide a bed by rotating the seat apparatus 2 laterally with respect to the base 1 and by fully reclining the back rest 4. As a result, the child supporting surface formed by the seat 3 and the fully reclined back rest 4 extend lengthwise of a passenger car seat and crosswise to the car length.

Referring to present FIG. 9, when the vehicular child seat 100 is used as a bed and fixed on the seat 120 of a vehicle, the vehicular child seat 100 is inclined backward, as the seat 120 of the vehicle is generally inclined backward for the comfort of a seated passenger. However, a child resting in the vehicular child seat 100 used as a bed is also inclined laterally, and the child is forced to be in an unnatural posture in the vehicular child seat 100 because there is a tendency to roll into the corner formed by the child support surface and the backrest of the passenger seat 120.

The vehicular child seat 100 is fixed by a seat belt installed in the vehicle. When the base 1 of the vehicular child seat 100 is to be fixed by the seat belt, it is difficult to secure the vehicular child seat 100 on the seat of the vehicle unless the seat belt is exactly adjusted. Even then the problem of rolling into the above mentioned corner is not solved.

SUMMARY OF THE INVENTION

An object of the present invention is to provide a child seat capable of holding a child in an almost horizontal state even when the child seat is used as a bed when the spinal axis of the child extends in parallel to a longitudinal axis of the passenger seat to which the child seat is attached.

Another object of the present invention is to provide a child seat allowing secure fixing of itself on a seat of a vehicle.

According to the present invention a child seat is provided including: a support surface supporting the child; a bottom surface which is in contact with a placing surface below the support surface wherein an angle of inclination of the support surface is adjustable relative to the bottom surface by an inclination angle changing apparatus which is effective for the inclination angle adjustment in any rotated position of the support surface relative to the bottom surface.

By this structure, it becomes possible when the child seat is placed on an inclined placing surface such as a car seat, to adjust the support surface for supporting the child, at any desired angle, by appropriately adjusting the inclination angle changing apparatus, whereby the child support surface is in a horizontal position regardless of any angle of the placing surface formed by the car seat relative to the horizontal.

When the child seat is fixed on the seat of a vehicle by the seat belt installed in the vehicle, it is possible to adjust a distance between the support surface and the bottom surface by adjusting the angle of inclination between the support surface and the bottom surface by the inclination angle changing apparatus. As a result, it becomes possible to adjust the tension of the seat belt installed in the vehicle. This enables a secure fixing of the child seat on the seat of the vehicle.

Preferably, in the child seat, one end of the bottom surface is journaled rotatably with respect to the support surface, and the inclination angle changing apparatus is so arranged as to be capable of adjusting the distance between the other end of the bottom surface and the support surface away from the journal.

Accordingly, the support surface can be inclined with one end of the bottom surface being the center. Therefore, it is possible to change the angle of inclination between the support surface and the bottom surface.

Preferably, the support surface is switchable between a child car chair and a child car bed. In the car chair the back rest is in a substantially upright position. In the car bed, the back rest is in a substantially horizontal position. Therefore, even when the child seat is used as a car bed, it is possible to maintain the support surface horizontal, regardless of the angle of inclination of the placing surface which is the surface of a passenger seat. Therefore, even when an infant is put on the support surface, he or she can be held securely and comfortably, not forcing the infant to take an unnatural posture in a corner between the backrest of the passenger seat and the child support surface of the child car bed.

According to another aspect, the present invention provides a child seat including a seat having a child support surface, and a base supporting the seat from below, the base having an upper surface rotatably fixed to the seat, a bottom surface with an angle of inclination that is variable with respect to the upper surface, and an inclination angle changing apparatus for changing the angle of inclination of the bottom surface of the base relative to the support surface.

By the above described structure, it is possible when the child seat is placed on a placing surface such as a passenger seat surface, to adjust the support surface supporting the child to a desired angle, by the adjustment of the inclination angle changing apparatus, regardless of the angle of the placing surface relative to the horizontal.

Further, when the child seat is fixed to the passenger seat of a vehicle by the seat belt installed in the vehicle, it is possible to adjust the distance between the support surface and the bottom surface by adjusting the angle of inclination between the support surface and the bottom surface by using the inclination angle changing apparatus. As a result, it is possible to adjust the tension of the seat belt installed in the vehicle. Therefore, the child seat can be secured to the passenger seat of the vehicle in a safe manner.

Preferably, the present child safety seat is switchable between the child car chair and a child car bed, whereby the seat portion or bed portion is rotatable relative to the base.

Therefore, even when the child seat is used as a bed, it is possible to maintain the child support surface horizontal regardless of the angle of inclination of the placing surface. Therefore, when an infant is put on the support surface, for example, he or she can be held securely and comfortably, and the infant cannot assume an unnatural posture.

The vehicular child safety seat in accordance with the present invention includes a seat for supporting a child and a base supporting the seat. The base can be secured to a passenger seat of the vehicle by a seat belt installed in the vehicle. The present safety seat further includes an attachment surface to which the seat belt installed in the vehicle is attached, and an attachment surface height adjusting apparatus for adjusting the height of the attachment surface relative to the passenger seat of the vehicle.

The present attachment surface height adjusting apparatus makes it possible to more securely fix the child seat to the passenger seat of a vehicle, as the tension of the seat belt can be increased by setting higher the attachment surface, for example.

Preferably, the base has a bottom surface which is in contact with the placing surface below the seat surface and the angle of inclination of the seat surface is adjustable with respect to the placing surface by the attachment surface height adjusting apparatus which is capable of changing the angle of inclination of the bottom surface with respect to the passenger seat surface which is the "placing surface".

Preferably, the attachment surface height adjusting apparatus is arranged for changing the height of the attachment surface with respect to the base. By increasing the height or elevation of the child seat surface, it becomes possible to increase the tension of the seat belt installed in the vehicle. As a result, the child seat can securely be fixed to the passenger seat of the vehicle.

Preferably, the present child seat has an inclination angle indicating apparatus for indicating an optimal angle of inclination of the support surface with respect to the placing surface, to make a child using the present seat most comfortable. Therefore, the optimal angle of inclination of the support surface when the child seat is used as a bed and the optimal angle of inclination of the support surface when the child seat is used as a chair can readily be adjusted. Therefore, it is possible to readily attain a desired comfort for the child.

Preferably, the child seat has an inclination angle range indicating apparatus for indicating an optimal range of the angle of inclination of the support surface with respect to a horizontal surface. The angle range is displayed on the chair and on the bed.

More preferably, the inclination angle range indicating apparatus indicates, when the vehicular child safety seat is used as a bed, that the support surface is almost horizontal. Further, the range indicator shows when the vehicular child safety seat is used as a chair, that the support surface or backrest is inclined upwardly with respect to the horizontal surface.

Accordingly, the optimal angle of inclination of the support surface when the child seat is used as a bed, the optimal angle of inclination of the support surface when the child seat is used as a chair are readily known by the user. Therefore, it is possible to attain a desired comfort for the child.

The foregoing and other objects, features, aspects and advantages of the present invention will become more apparent from the following detailed description of the present invention when taken in conjunction with the accompanying drawings.

DESCRIPTION OF A PREFERRED EMBODIMENT

An embodiment of the child seat in accordance with the present invention will be described with reference to FIGS. 1 to 4. FIGS. 1 to 4 show the present invention applied to a vehicular child seat.

Figure 1:
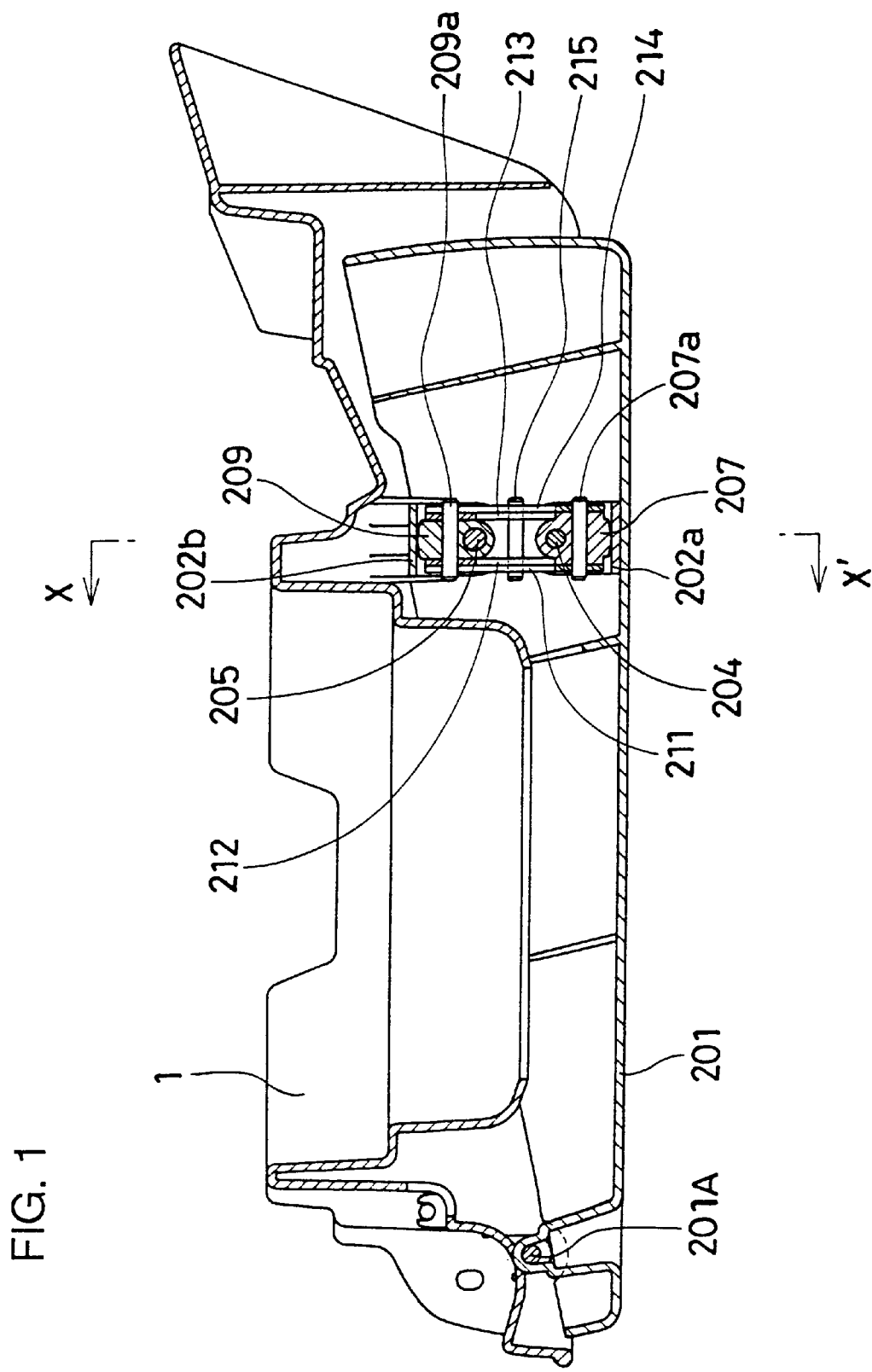
FIG. 1 is a section along a plane indicated by the arrow A in FIG. 8, through a seat base having a top or seat support section and a bottom section for a child seat with an inclination angle adjustment device in a low position between the two base sections according to the invention.
Figure 3:
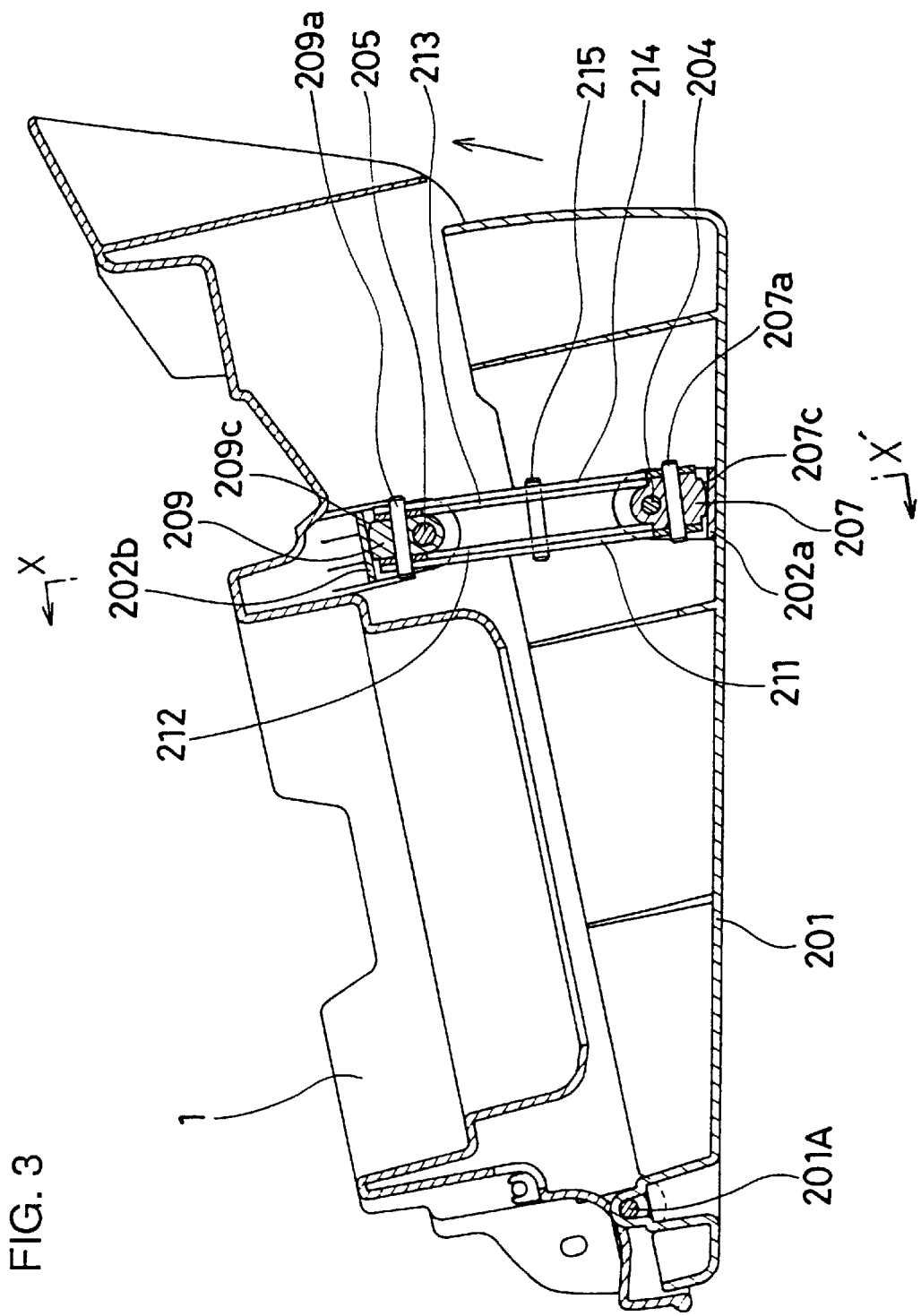
FIG. 3 is a cross-section as in FIG. 1, however showing the inclination angle adjustment device in a high position.
Figure 4:
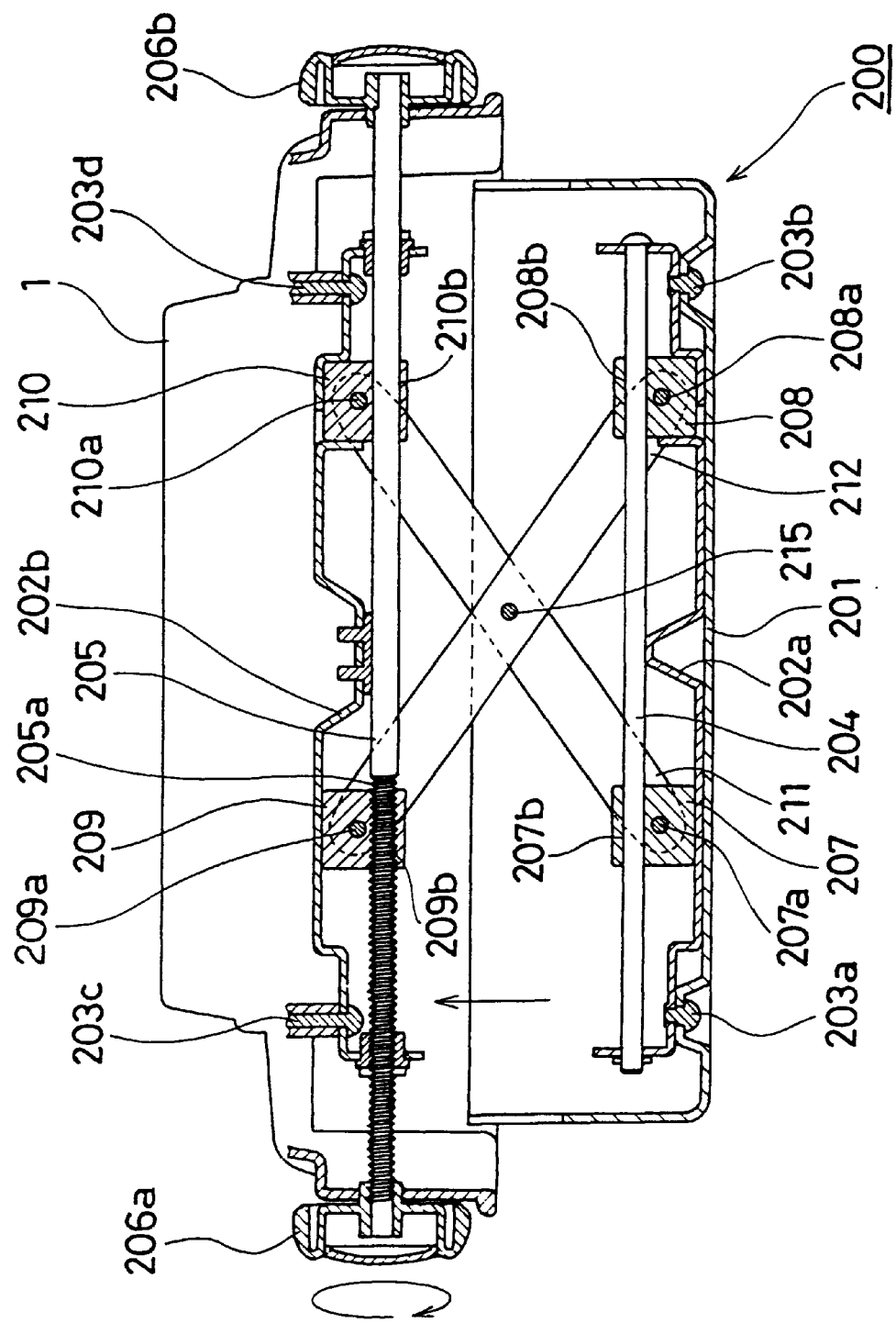
FIG. 4 is a cross-section taken along the line X–X' of FIG. 3.
Figure 8:
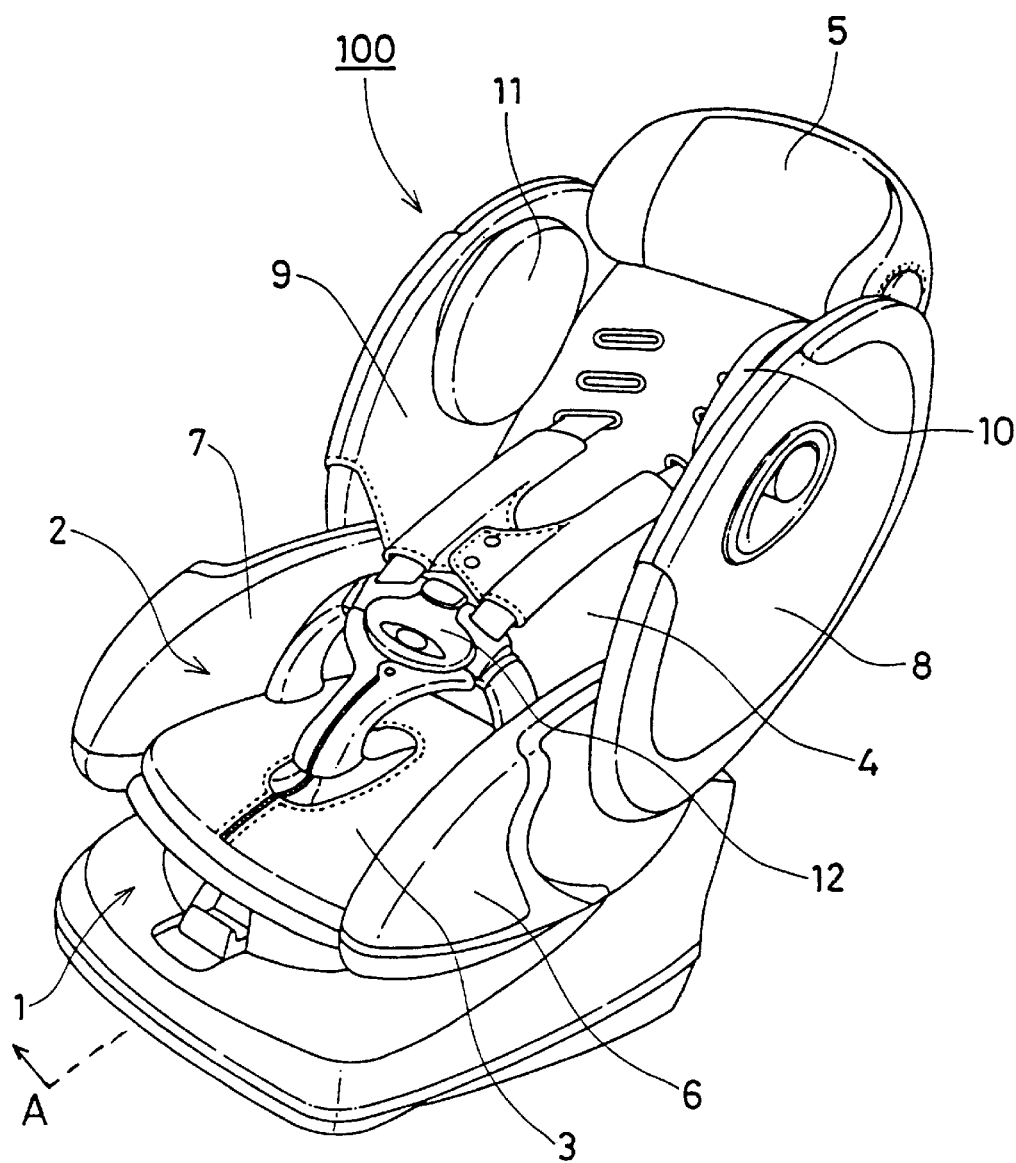
FIG. 8 is an overall perspective view showing the vehicular child seat improved by this invention.

The basic structure of the vehicular child seat is the same as that disclosed in the above mentioned copending U.S. Serial Number 09/004,699 briefly described above with respect to FIG. 8. Therefore, description thereof is not repeated, and only the mechanism of the base, which is the characteristic feature of the present invention, will be described in the following. FIGS. 1 and 3 are cross-sections taken along the arrow A of FIG. 8, and FIGS. 2 and 4 are cross-sections taken along the line X–X' of FIGS. 1 and 3.

Figure 2:
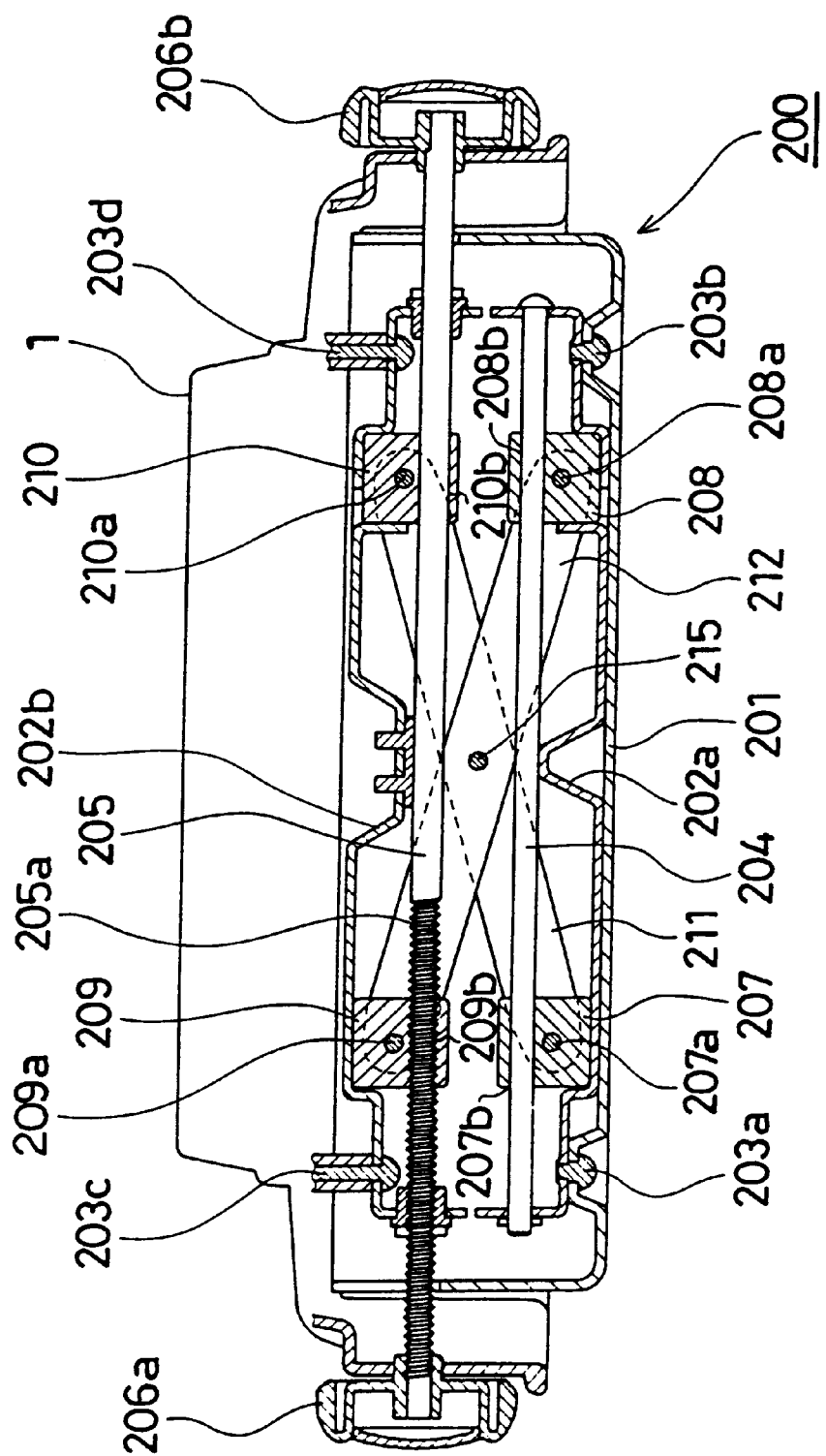
FIG. 2 is a cross-section taken along the line X–X' of FIG. 1.

First, referring to FIGS. 1 and 2, there is an inclination angle changing base having an upper section 1 and a lower section 201. An inclination angle changing mechanism 200 is positioned between the upper base section 1 and the lower base section 201 which are journaled rotatably to each other by a rotation axis 201A positioned near a lower left-hand corner in FIGS. 1 and 3. The inclination angle changing mechanism 200 is positioned opposite the axis 201A for adjusting a distance between the upper base section 1 and the lower base section 201 near the rear or right-hand side of the lower base section 201.

The inclination angle changing mechanism 200 has a lower bracket 202a attached to the lower base section 201 by means of rivets 203a and 203b shown in FIG. 2, and an upper bracket 202b attached to the upper base section 1 by means of rivets 203a and 203d. A lower guide shaft 204 extending laterally is supported by the lower bracket 202a. An upper drive shaft 205 is mounted to the upper bracket 202b above and parallel to the lower guide shaft 204.

At one end of the upper shaft 205, there is a male screw threading 205a. Handles 206a and 206b for rotating the upper shaft 205 are secured to opposite ends of the upper shaft 205.

The lower guide shaft 204 passes through a lower movable block 207 and through a lower fixed block 208. The lower movable block 207 is slidable along the lower guide shaft 204, as the lower shaft 204 is inserted through a sliding hole 207b provided in the lower movable block 207. The lower fixed block 208 is fixed on the lower bracket 202a and the lower shaft 204 passes through a sliding hole 208b provided in the lower fixed block 208.

The upper drive shaft 205 passes through an upper movable block 209 and through an upper fixed block 210. The upper movable block 209 is provided with a female threading 209b which mates with the male screw threading 205a provided on the upper drive shaft 205, whereby the block 209 is movable along the axial direction of the upper drive shaft 205 when the upper shaft 205 is rotated by turning at least one handle 206a or 206b.

The upper fixed block 210 is fixed to the upper bracket 202b, with the upper shaft 205 inserted through a sliding hole 210b provided in the upper fixed block 210.

Angle adjusting levers or links 211 and 214 are provided for coupling the lower movable block 207 to the upper fixed block 210. The angle adjusting levers 211 and 214 are journaled rotatable about a pin 207a with respect to the lower movable block 207 and journaled rotatably about a pin 210a with respect to upper fixed block 210.

Angle adjusting levers or links 212 and 213 are provided between lower fixed block 208 and upper movable block 209. The angle adjusting levers 212 and 213 are journaled rotatable to a journal pin 208a with respect to the lower fixed block 208, and journaled rotatable to a journal pin 209a with respect to the upper movable block 209. Therefore, the angle adjusting levers 211 and 214 and the angle adjusting levers 212 and 213 are arranged in X shape as shown in FIGS. 2 and 4, with the angle adjusting levers 211 to 214 journaled rotatably about a journal pin 215.

FIGS. 1 and 2 show the mechanism having the above described structure when the distance between the upper base section 1 and the lower base section 201 is the smallest. When the upper shaft 205 is rotated in a prescribed direction by turning the handles 206a and 206b, the upper movable block 209 driven by the threaded engagement male screw portion 205a moves inward accordingly.

Accordingly, a link mechanism is formed by the angle adjusting levers 211 to 214, whereby the distance between the upper base section 1 and the lower base section 201 can be gradually increased as shown in FIGS. 3 and 4. FIGS. 3 and 4 show the state when the distance between the base 1 and the inclination angle changing base section 201 is the largest. Similarly, FIGS. 1 and 2 show an adjusted state when this distance is the smallest.

When the upper base section 1 or the lower base section 201 rotates about the rotation axis 201a as shown in FIG. 3, the inclination angle changing mechanism 200 assumes a gradually inclined position with respect to the upper base section 1 and the lower base section 201. In order to attain this inclination smoothly, contact surfaces of the lower movable block 207 and of the lower fixed block 208 in contact with the lower bracket 202a have curved surfaces 207c, while contact surfaces of the upper movable block 209 and of the upper fixed block 210 in contact with the upper bracket 202b have curved surfaces 209c.

As described above, by rotating the upper shaft 205 in the prescribed direction by handles 206a and 206b, it is possible to adjust the spacing between the upper base section 1 and the lower base section 201 to an intended distance opposite the journal shaft 201A.

Figure 5:
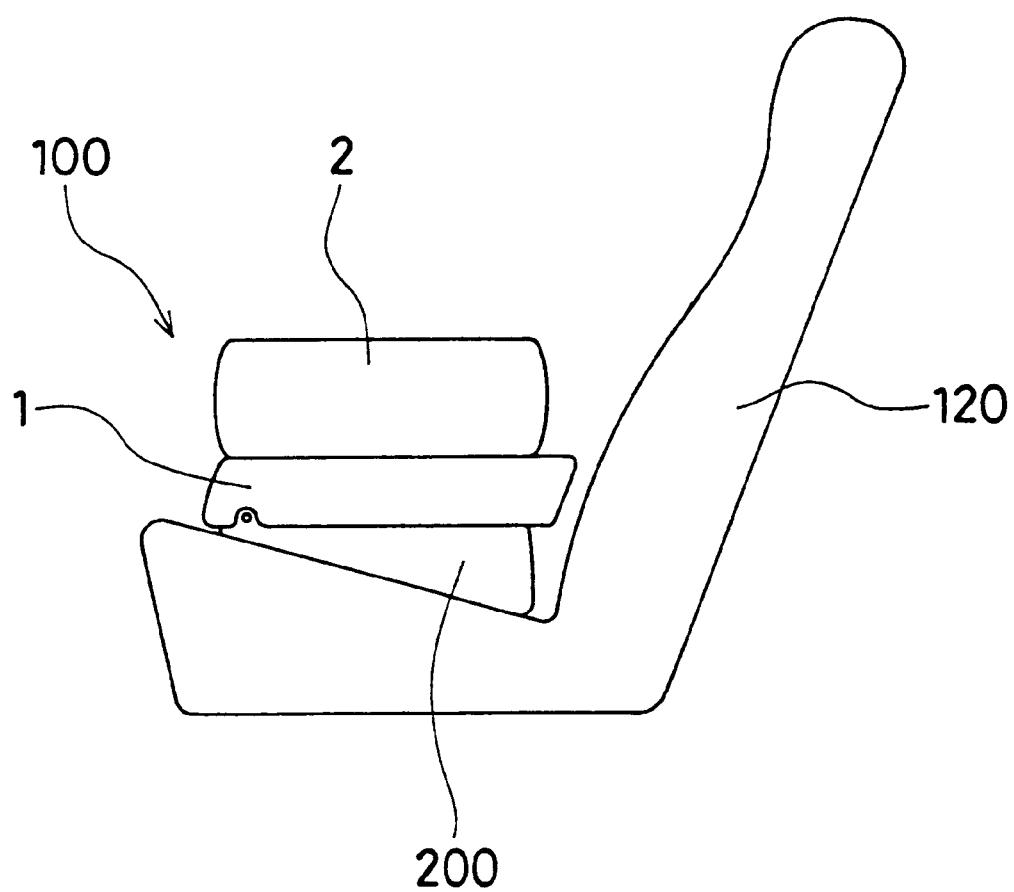
FIG. 5 is a schematic illustration showing the effect of the vehicular child seat of the present invention with the top or support section oriented horizontally after adjustment to a high position.
Figure 9:
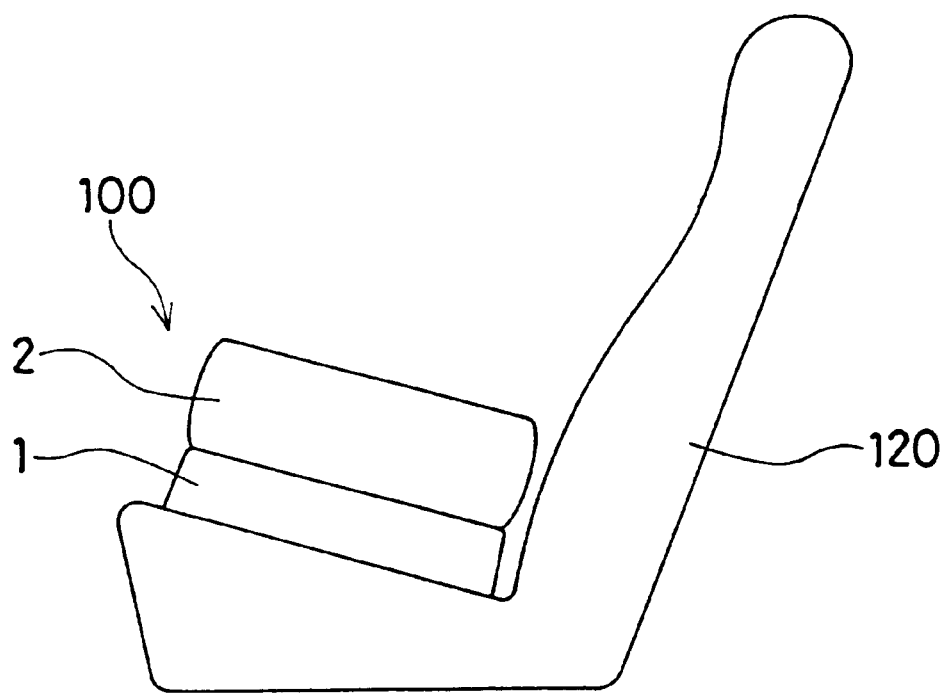
FIG. 9 is a schematic illustration of a problem solved by the present invention.

Therefore, when the vehicular child seat 100 having the inclination angle changing mechanism 200, is mounted on the seat of a vehicle and the child seat 100 is used as a bed, the seat apparatus 2 of the child seat 100 is level or horizontal as shown in present FIG. 5 in contrast to the slanted position as shown in present FIG. 9. The leveling is accomplished by setting the spacing between upper base section 1 and the lower base section 201 at the desired distance from each other. Accordingly, the problem described with reference to FIG. 9 has been avoided and a stable bed surface has been provided for the infant.

Further, when the vehicular child seat 100 is used as a chair, it is possible to set the seat apparatus 2 at an accurate angle by adjusting the space between the upper base section 1 and the lower base section 201 in accordance with the angle of rearward inclination of the vehicular seat.

Further, the following effects can be provided when the vehicular child seat 100 is mounted on a passenger car seat by using the seat belt.

Generally, when the vehicular child seat is fixed on the passenger car seat, an attachment surface for the seat belt of the vehicle is provided at a base section of the vehicular child seat. In order to secure the child seat to the passenger car seat, the seat belt must not be slack after fixing.

If it is possible to adjust the spacing between the upper base section 1 and the lower base section 201, it is possible to adjust the distance between the passenger car seat and the seat belt attachment surface on the base of the child seat. Therefore, the tension of the seat belt can be adjusted by changing the spacing between the upper base section 1 and the lower base section 201.

Though the present invention has been described above as applied to a vehicular child seat, the application is not limited to such a use. The present invention may be applied to any seat used for a child.

Through link mechanism utilizing inclination angle adjusting levers are used between the upper base section 1 and the lower base section 201 for adjusting the spacing between the upper base section 1 and the lower base section 201, the mechanism is not limited thereto. A mechanism utilizing a hydraulic cylinder, for example, may be employed.

As to the means for changing the spacing between the seat belt attachment surface and the passenger car seat when the child seat is mounted on a car seat, not only the mechanism for changing the spacing between the upper base section 1 and the lower base section 201 but also a mechanism for elevating the attachment surface may be provided only on the attachment surface, so as to adjust the tension of the seat belt.

Figure 6:
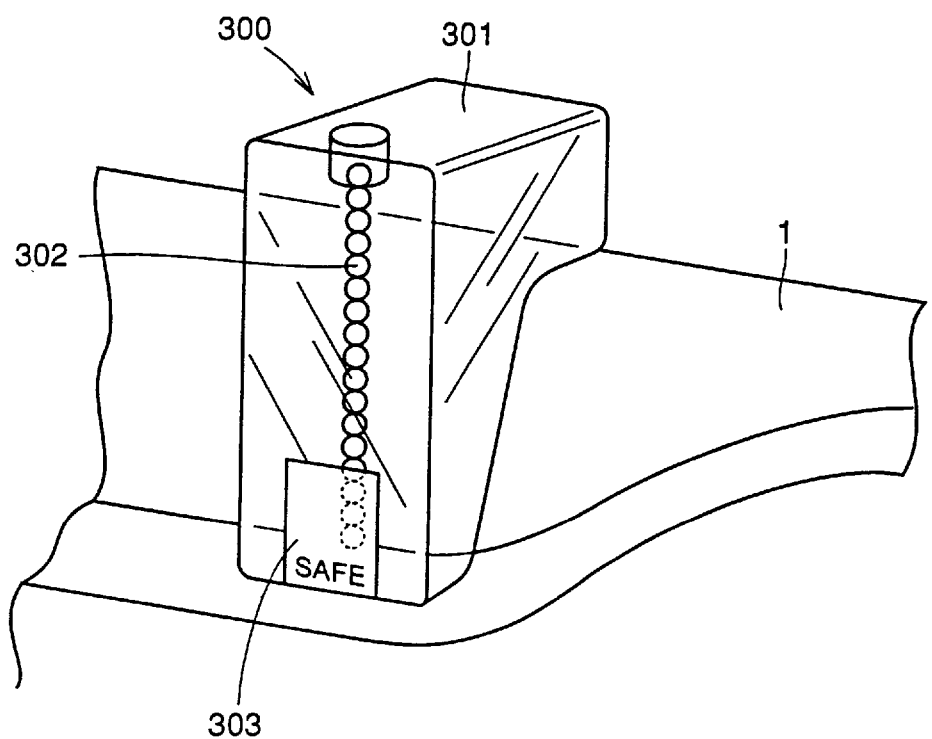
FIG. 6 is a schematic view of an inclination angle indicating device for indicating the angle of inclination of the base bottom section relative to the support section of the vehicular child seat of the present invention.

Preferably, an inclination angle indicating device 300 is provided on the upper base section 1, for indicating an optimal angle of inclination of the support surface with respect to the passenger car seat 120 in accordance with the current use of the child seat, as shown in FIG. 6.

The device 300 has a transparent case 301 and a chain 302 suspended from the top of the transparent case 301. A reference plate 303 is provided on the transparent case 301, for determining an optimal inclination angle of the support surface with respect to the car seat 120, based on the inclination of the chain 302.

Figure 7:
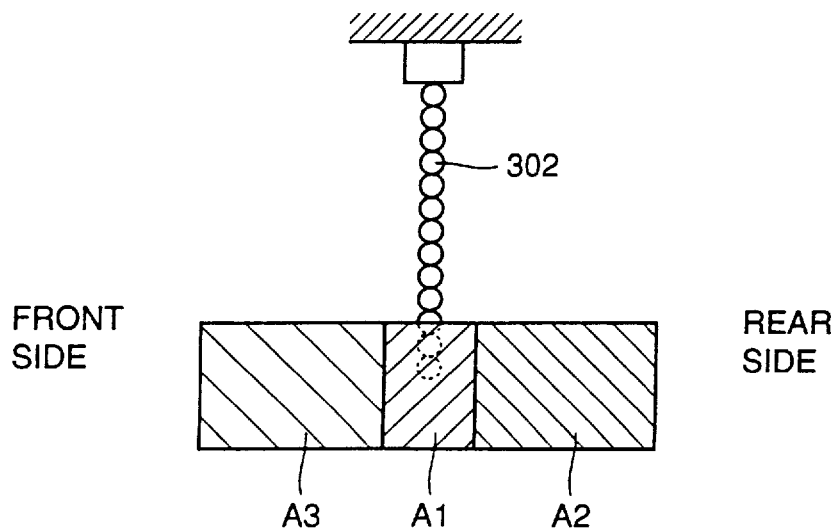
FIG. 7 represents the indication of the angle of the inclination.

As shown in FIG. 7, the reference plate 303 provides an indication of an optimal inclination angle range of the upper base section 1 through an indicator element A1 when the child seat is used as a bed. When the child seat is used as a chair an inclination angle range indicated by an indicator element A2 is optimal. An inclination angle range indicated by an indicator element A3 is not suitable for the present child seat.

By adjusting the lower base section 201 or rather the mechanism 200 such that the chain 302 is positioned in the indicated range of inclination, it is possible to comfortably support a child either on a chair or on a bed. In the present invention, the optimal range of the inclination angle shown by the indicator element A1 when the child seat is used as a bed corresponds to a range at which the bed surface is almost horizontal. The optimal range of the inclination angle shown by the indicator element A2 applicable when the child seat is used as a chair, corresponds to a range at which the child seat and its back rest is inclined rearwardly with respect to the horizontal surface. The undesirable range of the inclination angle indicated by the indicator element A3 corresponds to a range in which the child seat is inclined forward with respect to the horizontal surface.

The structure of an inclination angle indicating device actually used is not limited to the device 300 described above. A known level vial or the like may be used. Further, the location of attaching an inclination angle indicating device 300, is not limited to the upper base section 1. The level indicator may be attached to the handle 206*a* or 206*b* of the adjustment apparatus 200, provided that the operation of the handle is not hindered.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A child seat and seat base combination, comprising seat elements (2, 3, 4) forming a seat including a child support surface (3, 4) for supporting a child, a seat base (1, 201) supporting said seat elements (2, 3, 4), first means for rotating said seat elements including said child support surface (3, 4) relative to said seat base about an axis extending normal to said seat base (1, 201), and second means (200) operatively positioned for adjusting an inclination angle between said seat base and said child support surface (3, 4) for leveling said child support surface independently of any slanting position of said seat base relative to a horizontal plane and wherein said seat base comprises an upper base section (1) rotatably carrying said seat elements (2, 3, 4) and a lower base section (201) for positioning said child seat and said seat base on a placing surface, wherein said second means (200) for adjusting an inclination angle are operatively connected between said upper base section (1) and said lower base section (201), and further comprising a journal axis (201A) journaling said upper base section (1) to said lower base section (201), whereby said upper base section (1), which rotatably carries said seat elements including said support surface (3, 4), is adjustable in its angular position relative to said lower base section (201) by adjusting said second means (200) for increasing or decreasing a spacing between said upper base section (1) and said lower base section (201) opposite said journal axis (201A).

2. The combination of claim 1, wherein said seat elements include a seat (3) and a back rest (4), and wherein said back rest (4) is reclinable relative to said seat (3).

3. The combination of claim 1, wherein said upper base section (1) comprises a seat belt engagement wall portion which tightens a vehicle seat belt contacting said seat belt engagement wall portion when said spacing between said upper base section (1) and said lower base section (201) is increased by said second means (200) for adjusting said inclination angle between said upper base section (1) and said lower base section (201).

4. The combination of claim 1, further comprising an inclination angle indicator (300) connected to any one of said seat elements or said upper base section (1), said indicator (300) changing its position when said inclination angle is adjusted by said second means (200).

5. The combination of claim 4, wherein said inclination angle indicator (300) comprises range indicator elements (A1, A2, A3) positioned for indicating a current status of said seat elements as a chair or a bed, and wherein said indicator elements comprise a first indicator element (A1) for indicating a leveling range of said child support surface, and second and third indicator elements (A2, A3) for indicating an inclination of one of said seat elements relative to a normal to a horizontal plane.

6. The combination of claim 5, wherein said first indicator element (A) is positioned between said second and third indicator elements, (A2 and A3).

* * * * *